(12) United States Patent
Arora et al.

(10) Patent No.: US 7,346,598 B2
(45) Date of Patent: Mar. 18, 2008

(54) SCHEMALESS DATAFLOW WITHIN AN XML STORAGE SOLUTION

(75) Inventors: Siddhartha Cingh Arora, Redmond, WA (US); Christopher Clayton McConnell, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 402 days.

(21) Appl. No.: 10/185,019

(22) Filed: Jun. 28, 2002

(65) Prior Publication Data

US 2004/0002939 A1    Jan. 1, 2004

(51) Int. Cl.
   *G06F 7/08*    (2006.01)
(52) U.S. Cl. ......................... 707/1; 707/104.1
(58) Field of Classification Search ............ 707/1, 707/104.1, 102
   See application file for complete search history.

(56) References Cited

U.S. PATENT DOCUMENTS

| | | | |
|---|---|---|---|
| 6,418,448 B1 * | 7/2002 | Sarkar .................... | 707/104.1 |
| 6,519,597 B1 * | 2/2003 | Cheng et al. ............ | 707/10 |
| 6,601,071 B1 * | 7/2003 | Bowker et al. ........... | 707/102 |
| 6,604,100 B1 * | 8/2003 | Fernandez et al. ....... | 707/3 |
| 6,643,633 B2 * | 11/2003 | Chau et al. .............. | 707/1 |
| 6,721,727 B2 * | 4/2004 | Chau et al. .............. | 707/3 |
| 6,912,538 B2 * | 6/2005 | Stapel et al. ............ | 707/101 |
| 2002/0078068 A1 * | 6/2002 | Krishnaprasad et al. . | 707/104.1 |
| 2002/0169788 A1 * | 11/2002 | Lee et al. ............... | 707/104.1 |

OTHER PUBLICATIONS

Florescu, D et al., Storing and QWuerying XML Data using an RDMS, 1999, IEEE, 8 pages.*
Igor Dayen, Storing XML in Relational Databases, Jun. 20, 2001, www.xml.com, retrieved from http://www.xml.com/lpt/a/2001/06/20/databases.html, 12 pages.*
W3C, XML Path Language (XPath) Version 1.0, Nov. 16, 1999, pp. 1-3.*
W3Schols.com, Intorduction to XML Schema, Apr. 10, 2001, www.w3cschools.com, pp. 1-2.*

* cited by examiner

*Primary Examiner*—Paul Rodriguez
*Assistant Examiner*—Luke Osborne
(74) *Attorney, Agent, or Firm*—Woodcock Washburn LLP

(57) ABSTRACT

A relational database management system having an XML storage implementation to reduce overhead associated with consuming data from multiple data providers, where each having proprietary database schemas. The XML storage solution allows data from any arbitrary relational database schema to be loaded, rearranged and retrieved. The present invention is directed to an implementation of an edge table such that large volumes of XML data of any structure can be stored effectively. The edge table may be designed as one large XML document where the schema information is stored separately from the instances, and relationships and constraints are expressed using foreign keys. The edge table further provides for full type support and validation. Indices and clustering provide efficient data access and query execution.

15 Claims, 3 Drawing Sheets

```
<?xml version="1 0" encoding="utf-8"?>
<xsd:schema targetNamespace="http //www carpoint.com" xmlnsxsd="http://www w3 org/2001/XMLSchema"
 xmlns="http.//www.carpoint.com" elementFormDefault="qualified" id="example1">
 <xsd.element name="carpoint">
  <xsd:complexType>
   <xsd:sequence maxOccurs="unbounded">
    <xsd element name="car">
     <xsd:complexType>
      <xsd:sequence maxOccurs="unbounded">
       <xsd:element name="make" type="xsd:string"/>
       <xsd:element name="model" type="xsd.string"/>
       <xsd:element name="action" type="xsd string"/>
       <xsd.element name="category" type="xsd:string"/>
      </xsd sequence>
      <xsd:attribute name="id" type="xsd int"/>
     </xsd:complexType>
    </xsd.element>
   </xsd sequence>
  </xsd complexType>
 </xsd:element>
</xsd:schema>
```

```
<?xml version="1 0" encoding="utf-8"?>
<xsd:schema targetNamespace="http //www carpoint.com" xmlnsxsd="http://www w3 org/2001/XMLSchema"
xmlns="http.//www.carpoint.com" elementFormDefault="qualified" id="example1">
 <xsd.element name="carpoint">
  <xsd:complexType>
   <xsd:sequence maxOccurs="unbounded">
    <xsd element name="car">
     <xsd:complexType>
      <xsd:sequence maxOccurs="unbounded">
       <xsd:element name="make" type="xsd:string"/>
       <xsd:element name="model" type="xsd.string"/>
       <xsd:element name="action" type="xsd string"/>
       <xsd.element name="category" type="xsd:string"/>
      </xsd sequence>
      <xsd:attribute name="id" type="xsd int"/>
     </xsd:complexType>
    </xsd.element>
   </xsd sequence>
  </xsd complexType>
 </xsd:element>
</xsd:schema>
```

Fig. 2

```
<?xml version="1.0" encoding="UTF-8"?>
<carpoint xmlns="http://www.carpoint.com" xmlns:xsi="http://www.w3.org/2001/XMLSchema-
instance" xsi:schemaLocation="datafiles\carpoint.xsd">
 <car id="13">
        <make>Volkswagen</make>
        <model>Passat</model>
        <action>Buy</action>
        <category>Passenger</category>
 </car>
</carpoint>
```

Fig. 3

| Schema_node_id | Name | XPath | Parent | Element / Attribute | Min Occurs | Max Occurs | isInstance |
|---|---|---|---|---|---|---|---|
| 29 | carpoint | /carpoint | NULL | E | 1 | 1 | NULL |
| 30 | car | /carpoint/car | 29 | E | 1 | 1 | 1 |
| 31 | make | /carpoint/car/make | 30 | E | 1 | 1 | NULL |
| 32 | model | /carpoint/car/model | 30 | E | 1 | 1 | NULL |
| 33 | action | /carpoint/car/action | 30 | E | 1 | 1 | NULL |
| 34 | category | /carpoint/car/category | 30 | E | 1 | 1 | NULL |
| 35 | id | /carpoint/car/@id | 30 | A | 1 | 1 | NULL |

Fig. 4

| Instance_node_id | Schema_node_id | Parent | String_value_id | Int_value | Float_value | Date_value | Bool_value |
|---|---|---|---|---|---|---|---|
| 4 | 29 | NULL | NULL | NULL | NULL | NULL | NULL |
| 5 | 30 | 4 | NULL | NULL | NULL | NULL | NULL |
| 6 | 31 | 5 | 1 | NULL | NULL | NULL | NULL |
| 7 | 32 | 5 | 2 | NULL | NULL | NULL | NULL |
| 8 | 33 | 5 | 3 | NULL | NULL | NULL | NULL |
| 9 | 34 | 5 | 4 | NULL | NULL | NULL | NULL |
| 10 | 25 | 5 | NULL | 13 | NULL | NULL | NULL |

Fig. 5

| String_value_id | Value | Checksum |
|---|---|---|
| 1 | Volkswagen | -4578985 |
| 2 | Passat | 8978652 |
| 3 | Buy | -1254781 |
| 4 | Passenger | 36589745 |

Fig. 6

SCHEMALESS DATAFLOW WITHIN AN XML STORAGE SOLUTION

COPYRIGHT NOTICE/PERMISSION

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings hereto: Copyright© 2002, Microsoft Corporation, All Rights Reserved.

FIELD OF THE INVENTION

This invention relates in general to the field of information storage. More particularly, this invention relates to an XML storage solution for receiving and managing data received from multiple data providers.

BACKGROUND OF THE INVENTION

Internet portals and search engines, such as MSN®, serve as information gateways to Internet users by accumulating and categorizing information, and providing a wide array of services. Two methods are generally utilized to accumulate information and content to populate a portal's site. The first method is crawling the Web for information by utilizing so-called "spider" programs that examine Web pages looking for a variety of components. The spider scores each page for relevancy using the portal's search engine's proprietary algorithm. A limitation of this technique is that relevant information is often missed or ignored by the spider. Further, information that is contained within databases accessed via websites, i.e., information that must be queried to be retrieved, is not retrieved by spiders. Thus, searches conducted by visitors of portals that acquire information in this manner often do not yield satisfactory results and information. These dissatisfied visitors often leave the portal for another source of information.

The second method of acquiring data involves receiving content directly from affiliated data providers and importing the data into the portal's database management system. In the second method, the portals may regularly receive data from hundreds of sources. A limitation of this method is that data providers must conform to the portal's particular data format, and that both parties must agree upon changes to either party's data format. This means that the data providers must spend time and effort to transform from their own data format into the data format of the data aggregator or portal. Another limitation is that the data must be checked for accuracy, as errors in the importation process are common. Yet another limitation is that if the data provider changes its own format, the data aggregator must conform to these changes and vice versa. This is burdensome on the data providers and the portal operator, and makes it difficult for the portal to add new providers of data and content.

Related to the technical field of data exchange and interoperability, and the second method above, XML is quickly becoming a universal format for structured documents and data on the Web and in software programs. Structured data includes spreadsheets, address books, configuration parameters, financial transactions, and technical drawings. As is known in the art, the Extensible Markup Language (XML) is a set of rules for designing text formats that allows computers to generate and read data, and ensure that the data structure is unambiguous. The XML Specification is defined in "Extensible Markup Language (XML) 1.0 (Second Edition)," W3C Recommendation, Oct. 6, 2000, which is incorporated herein by reference in its entirety.

In XML, tags are used to delimit the data within an XML data file ("instance document") and XML Schemas allow developers to precisely define the structures of their own XML-based formats. The data in the files may be manipulated via several modules and services. Such services include Xpointer, which is a syntax for pointing to parts of an XML document in a similar fashion as a Uniform Resource Locator (URL). Another service is XSL, which is the advanced language for expressing style sheets in XML. XSL is based on XSLT, which is the transformation language used for rearranging, adding and deleting tags and attributes.

Another service is XPath which provides a common syntax and semantics for functionality shared between XSLT and XPointer. XPath gets its name from its use of a path notation (as in URLs) for navigating through the hierarchical structure of an XML document. The primary purpose of XPath is to address parts of an XML document and it also provides basic facilities for manipulation of strings, numbers and booleans. XPath uses a compact, non-XML syntax to facilitate use of XPath within Uniform Resource Identifiers (URI) and XML attribute values. URIs are strings that identify resources in the web such as documents, images, downloadable files, services, electronic mailboxes, and other resources. XPath operates on the abstract, logical structure of an XML document, rather than its surface syntax.

In addition to its use for addressing, XPath can be used for matching, i.e., testing whether a node matches a pattern. XPath models an XML document as a tree of different types of nodes, e.g., element nodes, attribute nodes and text nodes. XPath fully supports XML Namespaces, where developers can qualify element names and relationships to make names recognizable and to avoid name collisions.

With all of these advantages, it is desirable to apply XML to the problem of receiving and processing data from external data providers. Thus, in view of the foregoing, there is a need for systems and methods that overcome the limitations and drawbacks of the prior art. In particular, there is a need for system by which portals and other data aggregators may utilize XML as a means of simplifying the transferring and validating data and content.

SUMMARY OF THE INVENTION

The present invention is directed to a platform having reduced overhead associated with consuming data from multiple data providers, each having proprietary database schemas, by creating a database system having an XML storage implementation. Using a unique implementation of an edge table, large volumes of XML data of any structure can be stored effectively.

In accordance with an aspect of the present invention, there is provided in a database management system, a tabular method for storing XML data. A schema table is provided for storing an XSD schema, an instance table for storing a structure of XML instance data related to the XSD schema, and a content table for sbring content from an instance document associated with the XSD schema. The XSD schema is enforced on the content and the XML instance data via a foreign key.

In the database management system, XML data is separated from relational data within the database management system. Additionally, SQL language queries of the database management system may include a statement containing XPath for the XML instance data or a statement containing the relational data.

The edge table in accordance with the present invention may be designed as one large XML document and the schema information is stored separately from the instances, and relationships and constraints are expressed using Foreign Keys. The edge table further provides for full type support and validation. Indices and clustering provide efficient data access and query execution. The edge table recognizes datatypes, therefore, no conversion is necessary because the values are stored in actual types.

In accordance with another aspect of the present invention, there is provided a method of receiving data from multiple external data providers that includes: receiving XML data including definitions of instances for each data provider, maintaining an instance node identifier for each instance, mapping the instance node identifier to an instance key defined by the definitions; and storing the mapping in an edge table.

In accordance with yet another aspect of the invention, there is provided a system for providing queryable data to users having a relational database management system including an XML data exchange structure for receiving content from multiple external sources. The system includes a schema table for storing an XSD schema and an instance table for storing a structure of XML instance data related to the XML schema. The XSD schema is applied to the XML instance data via a foreign key in the instance table that enforces a hierarchy of elements and attributes stored within the schema table.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 2 is an exemplary schema, carpoint.xsd;

FIG. 3 is an exemplary instance document, carpoint.xml, that is associated with the schema of FIG. 2;

FIG. 4 is an exemplary "schema_node" table storing elements and attributes of the XSD schema of FIG. 2;

FIG. 5 is an exemplary "instance_node" or edge table containing XML instance data related to the XSD schema of FIG. 2; and FIG. 6 illustrates an exemplary "string_value" table where the content within the carpoint.xml document of FIG. 3 is stored.

DETAILED DESCRIPTION OF PREFERRED EMBODIMENTS

Figure 1:
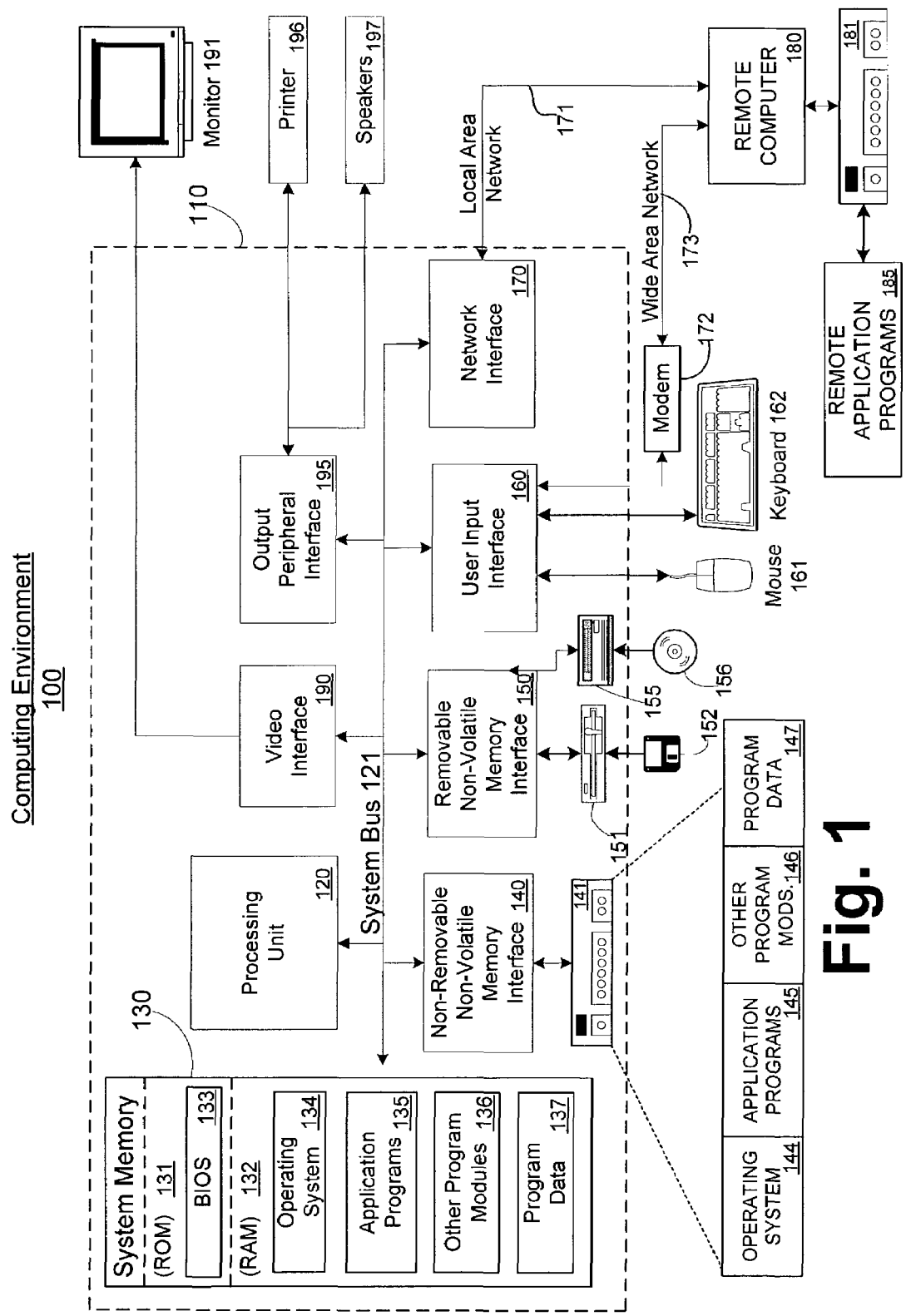
FIG. 1 is a block diagram showing an exemplary computing environment in which aspects of the invention may be implemented.

The present invention is directed to systems and methods that provide for reducing the overhead to consume data provided by multiple data providers. The present invention is preferably implemented using XML file formats such that the data can be easily loaded, rearrange and retrieved.

Exemplary Computing Environment

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 140 that reads from or writes to non-removable, nonvolatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET platform includes servers, building-block services, such as Web-based data storage and downloadable device software. Generally speaking, the NET platform provides (1) the ability to make the entire range of computing devices work together and to have user information automatically updated and synchronized on all of them, (2) increased interactive capability for Web sites, enabled by greater use of XML rather than HTML, (3) online services that feature customized access and delivery of products and services to the user from a central starting point for the management of various applications, such as e-mail, for example, or software, such as Office .NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While exemplary embodiments herein are described in connection with software residing on a computing device, one or more portions of the invention may also be implemented via an operating system, application programming interface (API) or a "middle man" object between a coprocessor and requesting object, such that the debugging of the present invention may be performed by, supported in, or accessed via all of .NET's languages and services, and in other distributed computing frameworks as well.

Overview

The present invention is directed toward reducing the overhead associated with consuming data from multiple data providers, each having proprietary database schemas, by creating a database system having an XML storage solution. The XML storage solution allows data from any arbitrary relational database schema to be loaded, rearranged and retrieved by a data aggregator (portal). The use of XML is preferable because there are standard tools for parsing, validating (XSD), querying (Xpath) and transforming (XSLT) data. Thus, an XML solution is particularly useful for receiving and managing data provided by affiliated providers.

As used herein, an "instance" is a specific combination of content. This can be analogized to a document in a traditional Information Retrieval system. An instance is used to generalize to things like a description of a particular book, hotel or flight. Instances can be hierarchical and can be conceptualized as a block of XML. A "schema" is a description of the legal structure of an instance and is generally defined using an XML Schema Description file. A "node" is a particular element or attribute within a schema. "Content" are legal values for content found at particular places in a schema. For example, "Toyota," "Honda," "GM," etc. would all be legal content for "make" within a "car" schema.

Edge tables represent the fine-grained XML document structure (for example, element/attribute names, the document hierarchy, the namespaces, processing instructions, and so on) in a single table. The present invention is directed to a unique implementation of an edge table such that large volumes of XML data of any structure can be stored effectively. In particular, the edge table in accordance with the present invention is designed as one large XML document (i.e., thedatabase is the root) where schema information is stored separately from the instances and relationships and constraints are expressed using foreign keys. The edge table further provides for full type support and validation. The edge table recognizes following datatypes: Integer, String, Boolean, Float, Datetime, and NTEXT (for storing binary large object data). Thus, because the values are stored in actual types no conversion overhead is necessary. Advantageously, String values are stored separately to remove redundancy and efficient indexing is used for fast searches. Further, indices and clustering provide efficient data access and query execution. Document order and hierarchy is fully preserved in the table. Also, elements or attributes (node) in the XML document can be annotated using synsets (synonymous terms) to provide for more meaningful user queries.

The above edge table is called "instance_node" in the database schema of the present invention. The XSD schema for this instance data is stored in the "schema_node" table. The content data is stored in the "content" table and the XSD schema is enforced on content and instance data using "schema_node_id" as foreign key to these tables.

An instance from the database schema point of view is merely a roll up of "instance_node". From a business perspective, an instance can be thought of as the result that is returned to the user when he/she searches for a particular query string. The instance is preferably different for each data provider. For example, a site or a category is an instance for Looksmart, a hotel is an instance for Expedia, and a car is an instance for Carpoint. Because, the present invention has the capability to accept data pertaining to any structure, the instances are defined in order to be consumed by the database management system. The definition is made in an Extension.xml file for each provider. The present invention additionally maintains an internal INSTANCE_ID for each instance and this is mapped to the INSTANCE (key) defined in the extensions file. This separation advantageously allows the XML data to be separated from the relational data.

The relationships between instances are stored in the "relationship" table. Preferably, parent-child relationships are supported, however, other relationships may be supported in accordance with design needs. These relationships are used to describe taxonomy/category/tree structures. Another feature the present invention provides for the ability to mix the XPath for XML instance data with relational data. For example, a SQL statement such as the following may be written:

SELECT keyphrase.string
FROM keyphrase kp
  INNER JOIN keyphrase_synset ks
  ON ks.keyphrase_id=kp.keyphrase_id
  INNER JOIN instance_synset iss
  ON iss.synset_id=ks.synset_id
WHERE iss.instance_id=/book[contains(author, "chris")]

In accordance with the above, FIGS. 2-6 illustrate an exemplary schema, associated instance document, "schema_node" table (schema table), "instance_node" table (edge table), and "string_value" table (content table). Referring now to FIGS. 2-3, there is illustrated an exemplary schema "carpoint.xsd" (FIG. 2) and its associated instance document, carpoint.xml (FIG. 3). The carpoint element of the XSD schema includes a subelement "car" having further subelements of "make," "model," "action," and "category." The "car" subelement has the attribute of "id" which is an integer. In accordance with the carpoint.xsd schema, carpoint.xml includes data for a VOLKSWAGEN PASSAT, identified by car id 13 for the action of "buy."

Referring now to FIG. 4, the structure of the XSD schema of FIG. 2 may be stored as data within the exemplary "schema_node" table of the database schema of the present invention. The primary key of the table is "Schema_node_id" and the elements and attributes of carpoint.xsd (i.e., "carpoint," "car," "make," "model," "action," "category," and "id") are identified in the "Name" column for each unique value of the "Schema_node_id". An "XPath" value and "Parent" are defined for each "Name" value to preserve the hierarchy of each "Name" value in the table. The "Element/Attribute" column defines if the "Name" value is an element or attribute of the XSD schema. The "Min Occurs" and "Max Occurs" columns define the minimum and maximum occurrences of the "Name" value in the XSD Schema. Finally, the isInstance column is set to 1 if the "Name" value is an Instance in accordance with the present invention.

Referring now to FIG. 5, the structure of the XML instance data may be stored in the exemplary "instance_node" table (i.e., edge table). Each value of the primary key, "Instance_node_id" refers to the "Schema_node_id" as a foreign key to relate the instances within the data to each other and to assign the datatype to the instances. The "Parent" column value also develops a hierarchy. The datatype is assigned in "String_value_id," "Int_value," "Float_value," "Date_value," and "Bool_value" columns.

FIG. 6 illustrates an exemplary "string_value" table where the content within the carpoint.xml document is stored. Each content value is uniquely referred to by the "String_value_id" foreign key. A checksum is provided to ensure the integrity of the "Value" information.

As is now evident to one of ordinary skill in the art, the present invention provides a platform to consume data of any structure in XML. As such, data providers do not have to invest efforts to transform their data into a format that the data aggregator (portal) can understand, and can spend more time in value-add. Thus, by building on the conventional edge table and by separating the XML data from the relational data, the present invention provides a low maintenance mechanism to quickly and easily consume schemas and instance data authored by external sources of data. Further, the present invention provides the ability to JOIN (the SQL command) data from multiple data providers and provide a single result.

While the present invention has been described in connection with the preferred embodiments of the various Figs., it is to be understood that other similar embodiments may be used or modifications and additions may be made to the described embodiment for performing the same function of the present invention without deviating therefrom. For example, one skilled in the art will recognize that the present invention as described in the present application may apply to any computing device or environment, whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. In a database management system implemented on a computer, said computer including a tangible computer-readable medium having recorded thereon a tabular structure for storing XML data comprising:
   a schema table for storing an XML Schema Definition (XSD) schema;
   an instance table for storing a structure of Extensible Markup Language (XML) instance data related to said XSD schema; and
   a content table for storing content from an instance document associated with said XSD schema,
   wherein said XSD schema is enforced on said XML instance data via a first foreign key, said content is reference to said instance data via a second foreign key, and XML data is stored separate from relational data within said database management system,
   the tabular structure further comprising a relationship table for storing relationships between instances, the relationships including parent-child relationships.

2. The database management system implemented on a computer as recited in claim 1, wherein said schema table includes a name value and an XPath value for each element and attribute within said XSD schema.

3. The database management system implemented on a computer as recited in claim 2, wherein said schema table further includes a parent value of each name value to express a hierarchy of said name values.

4. The database management system implemented on a computer as recited in claim 1, wherein said instance table includes said first foreign key value from said schema table to relate said XML instance data to said XSD schema.

5. The database management system implemented on a computer as recited in claim 4, wherein said instance table includes datatype value information for each instance.

6. The database management system implemented on a computer as recited in claim 4, wherein said instance table includes a parent value of each instance to express a hierarchy of said instances.

7. The database management system implemented on a computer as recited in claim 1, wherein structured query language (SQL) language queries of said database management system include at least one of a statement containing XPath for said XML instance data and a statement containing said relational data.

8. In a relational database management system, a method of receiving data from multiple external data providers, comprising:
   receiving XML data, including definitions of instances for each data provider;
   maintaining an instance node identifier for each instance;
   mapping said instance node identifier to an instance key defined by said definitions;
   storing said mapping in an edge table; and
   storing an XSD schema stored in a schema table and relating said schema table to said edge table by a schema node identifier,
   wherein said XML data is maintained separately from relational data within said relational database management system, and wherein said edge table references at least one content table containing elements within said XML data via a content identifier,
   the method further comprising storing relationships between instances in a relationship table, the stored relationships in such table including parent-child relationships.

9. The method as recited in claim 8, further comprising annotating data within said edge table and said schema table.

10. The method as recited in claim 8, further comprising querying said data within relational database management system using statements containing XPath for XML instance data and statements for relational data.

11. A system for providing queryable data to users of a computing device having a relational database management system including an XML data exchange structure for receiving content from multiple external sources, said computing device having stored thereon:

a schema table for storing an XSD schema;

an instance table for storing a structure of XML instance data related to said XML schema, wherein said XSD schema is applied to said XML instance data via a first foreign key in said instance table that enforces a hierarchy of elements and attributes stored within said schema table, and wherein content maintained in a content table is reference to said XML instance data via a second foreign key; and a content table for storing content from an instance document associated with said XSD schema, wherein XML data is stored separate from relational data within said database management system, the computing device further having stored thereon a relationship table for storing relationships between instances, the relationships including parent-child relationships.

12. The system as recited in claim 11, wherein said schema table includes a name value and XPath value for each element and attribute within said XSD schema.

13. The system as recited in claim 11, wherein said instance table includes datatype value information for each instance.

14. The system as recited in claim 11, wherein SQL language queries of said database management system include at least one of a statement containing XPath for said XML instance data and a statement containing said relational data.

15. The system as recited in claim 11, wherein data within tables of said relational database management system contain information to annotate data within said tables to provide additional information to facilitate queries.

* * * * *